United States Patent [19]

Clark

[11] Patent Number: 5,707,106
[45] Date of Patent: Jan. 13, 1998

[54] COMBINATION CAR SEAT AND STROLLER

[76] Inventor: William A. Clark, 117 Wayne Ave., Scarborough, Ontario, Canada, M1R 1Y8

[21] Appl. No.: 610,204

[22] Filed: Mar. 4, 1996

[51] Int. Cl.⁶ ................................................. A47C 13/00
[52] U.S. Cl. .................... 297/130; 297/256.16; 280/30; 280/643
[58] Field of Search ...................... 297/130, 256.16; 280/30, 47.38, 47.4, 643, 648

[56] References Cited

U.S. PATENT DOCUMENTS

| | | | |
|---|---|---|---|
| 4,157,839 | 6/1979 | Lahti et al. | 280/643 X |
| 4,768,795 | 9/1988 | Mar | 280/30 |
| 4,921,261 | 5/1990 | Sadler, Jr. et al. | 280/643 X |
| 5,121,940 | 6/1992 | March | 280/30 X |
| 5,133,567 | 7/1992 | Owens | 280/30 |
| 5,306,029 | 4/1994 | Karser, II | 280/30 |
| 5,499,831 | 3/1996 | Worth et al. | 280/643 X |

*Primary Examiner*—Laurie K. Cranmer

[57] ABSTRACT

A combination car seat and stroller includes a carrier portion having a U-shaped handle with free ends thereof pivotally secured to a pair of side portions thereof. Each of the pair of side walls have slots formed therethrough to receive a car seat belt therethrough for securement of the carrier portion within a car. A collapsible stroller portion is dimensioned to receive the carrier portion thereon.

1 Claim, 3 Drawing Sheets

COMBINATION CAR SEAT AND STROLLER

BACKGROUND OF THE INVENTION

1. Field of the Invention

The present invention relates to a combination car seat and stroller and more particularly pertains to attaching a child's car seat to a stroller for multiple usage with a combination car seat and stroller.

2. Description of the Prior Art

The use of convertible child seats is known in the prior art. More specifically, convertible child seats heretofore devised and utilized for the purpose of converting a child's seat to another structure are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,188,380 to Tucek discloses a general utility child seat apparatus.

U.S. Pat. No. 5,149,113 to Alldredge discloses a convertible stroller and car seat.

U.S. Pat. No. Des. 305,583 to Turner et al. discloses the ornamental design for a child car seat.

U.S. Pat. No. 5,265,931 to Ryan discloses a detachable child seat and supporting frame.

U.S. Pat. No. 4,946,180 to Baer discloses a convertible child support apparatus.

U.S. Pat. No. 4,822,064 to Hunter discloses a combination child vehicle seat and stroller.

While these devices fulfill their respective, particular objective and requirements, the aforementioned patents do not describe a combination car seat and stroller for attaching a child's car seat to a stroller for multiple usage.

In this respect, the combination car seat and stroller according to the present invention substantially departs from the conventional concepts and designs of the prior art, and in doing so provides an apparatus primarily developed for the purpose of attaching a child's car seat to a stroller for multiple usage.

Therefore, it can be appreciated that there exists a continuing need for new and improved combination car seat and stroller which can be used for attaching a child's car seat to a stroller for multiple usage. In this regard, the present invention substantially fulfills this need.

SUMMARY OF THE INVENTION

In the view of the foregoing disadvantages inherent in the known types of convertible child seats now present in the prior art, the present invention provides an improved combination car seat and stroller. As such, the general purpose of the present invention, which will be described subsequently in greater detail, is to provide a new and improved combination car seat and stroller and method which has all the advantages of the prior art and none of the disadvantages.

To attain this, the present invention essentially comprises a carrier portion having an upper portion, a lower portion, a front surface, a rear surface, and a pair of side portions. The front surface has a child receiving recess formed therein. The carrier portion has a U-shaped handle with free ends thereof pivotally secured to the pair of side portions thereof. Each of the pair of side walls have slots formed therethrough to receive a car seat belt therethrough for securement of the carrier portion within a car. The rear surface has a plurality of hook and loop fastener strips thereon. The device includes a collapsible stroller portion comprising a seat receiving portion, a handle portion, a cover portion, and a support frame with wheels. The seat receiving portion has a plurality of hook and loop fastener strips disposed thereon. The seat receiving portion is dimensioned to receive the carrier portion thereon with the hook and loop fastener strips of the carrier portion cooperating with the hook and loop fastener strips thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved combination car seat and stroller which has all the advantages of the prior art convertible child seats and none of the disadvantages.

It is another object of the present invention to provide a new and improved combination car seat and stroller which may be easily and efficiently manufactured and marketed.

It is a further object of the present invention to provide a new and improved combination car seat and stroller which is of durable and reliable construction.

An even further object of the present invention is to provide a new and improved combination car seat and stroller which is susceptible of a low cost of manufacture with regard to both materials and labor, and which accordingly is then susceptible of low prices of sale to the consuming public, thereby making such a combination car seat and stroller economically available to the buying public.

Still yet another object of the present invention is to provide a new and improved combination car seat and stroller which provides in the apparatuses and methods of the prior art some of the advantages thereof, while simultaneously overcoming some of the disadvantages normally associated therewith.

Even still another object of the present invention is to provide a new and improved combination car seat and stroller for attaching a child's car seat to a stroller for multiple usage.

Lastly, it is an object of the present invention to provide a new and improved combination car seat and stroller includes a carrier portion having a U-shaped handle with free ends thereof pivotally secured to a pair of side portions thereof. Each of the pair of side walls have slots formed therethrough to receive a car seat belt therethrough for securement of the carrier portion within a car. A collapsible stroller portion is dimensioned to receive the carrier portion thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
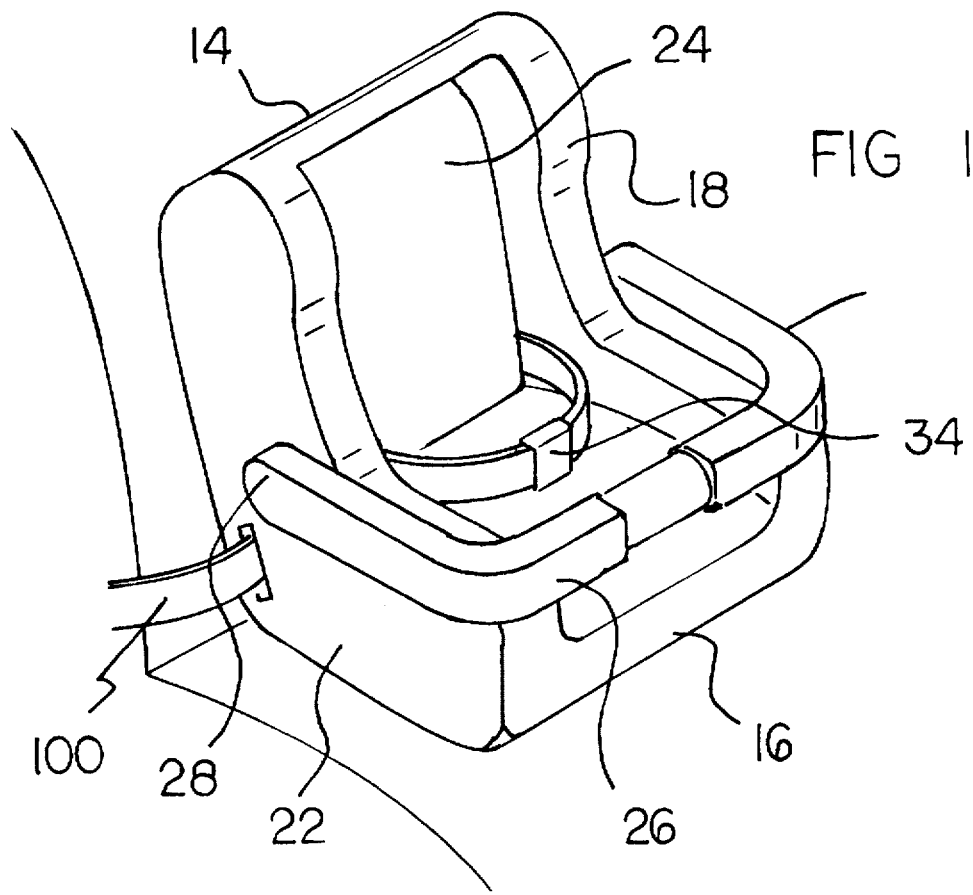
FIG. 1 is a perspective view of the preferred embodiment of the combination car seat and stroller constructed in accordance with the principles of the present invention.
Figure 2:
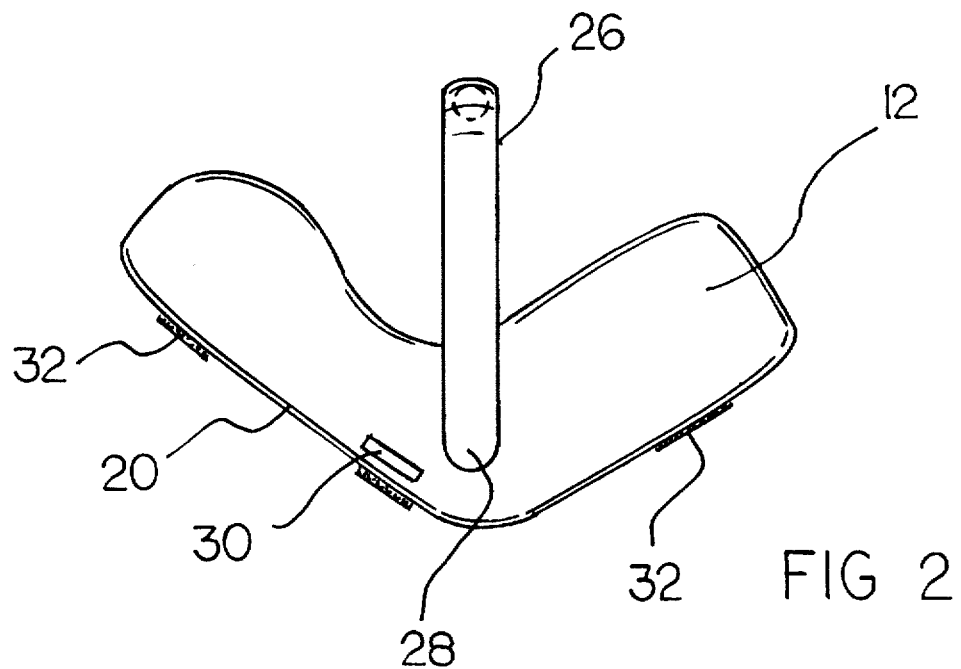
FIG. 2 is a side elevation view of the carrier of the present invention.
Figure 3:
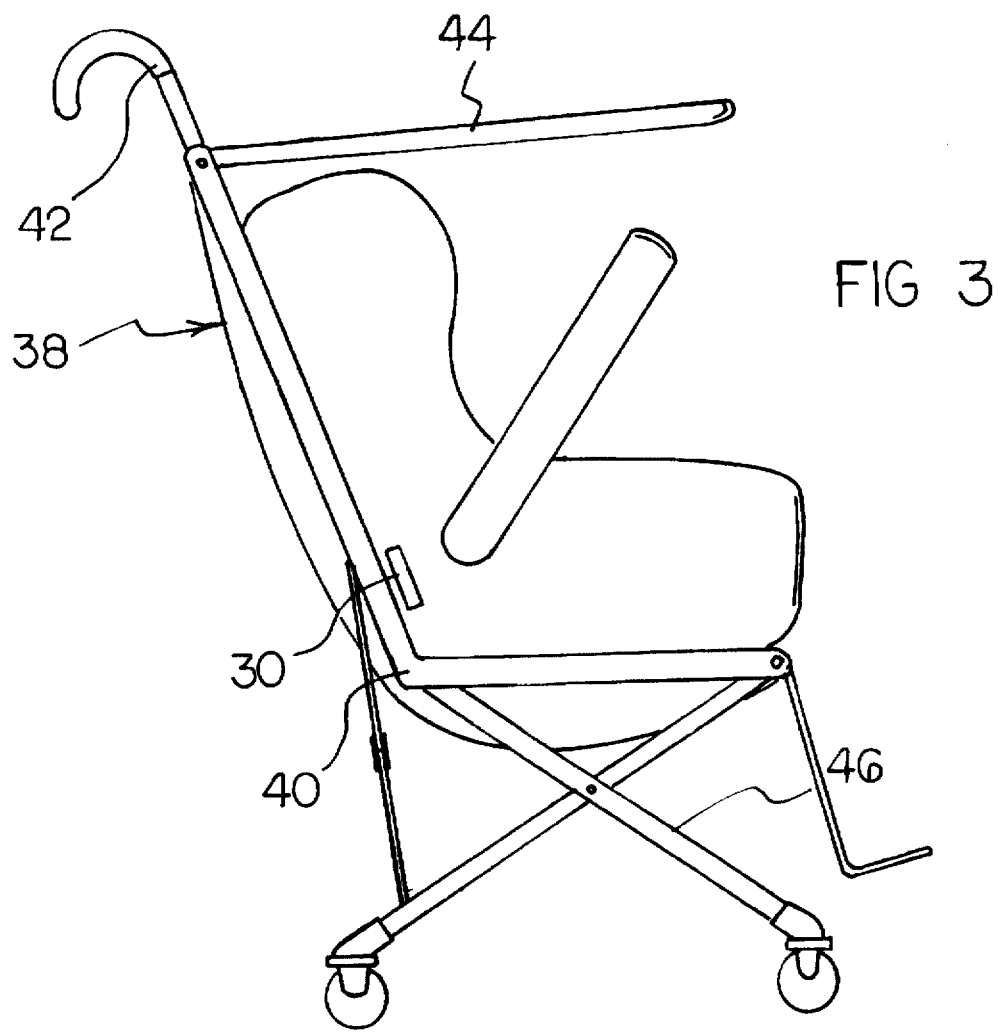
FIG. 3 is a side view of the carrier coupled with the stroller.
Figure 4:
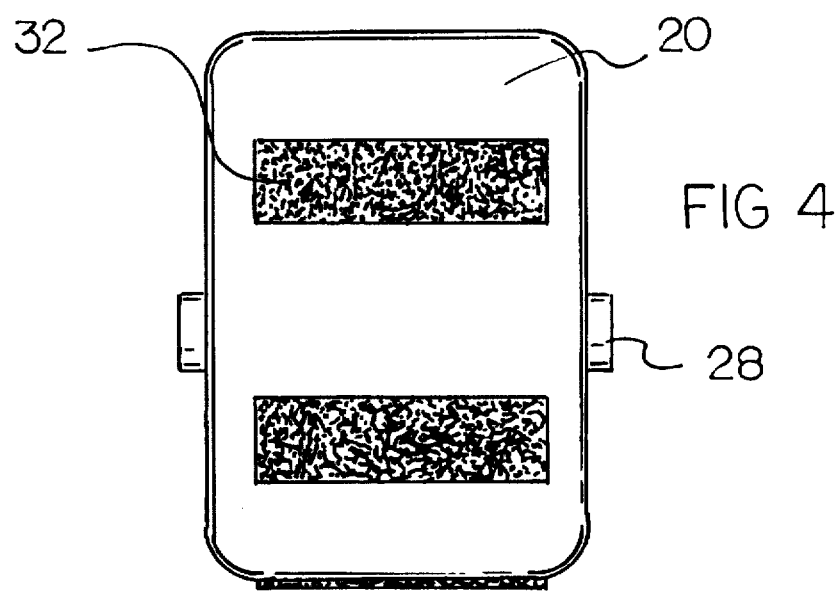
FIG. 4 is a rear view of the carrier illustrating the hook and loop fasteners thereon.

With reference now to the drawings, and in particular, to FIGS. 1-4 thereof, the preferred embodiment of the new and improved combination car seat and stroller embodying the principles and concepts of the present invention and generally designated by the reference number 10 will be described.

Specifically, it will be noted in the various Figures that the device relates to a new and improved combination car seat and stroller for attaching a child's car seat to a stroller for multiple usage. In its broadest context, the device consists of a carrier portion and a collapsible stroller portion. Such components are individually configured and correlated with respect to each other so as to attain the desired objective.

The device 10 includes a carrier portion 12 having an upper portion 14, a lower portion 16, a front surface 18, a rear surface 20, and a pair of side portions 22. The carrier portion 12 is constructed of rigid plastic with comfortable foam padding. The front surface 18 has a child receiving recess 24 formed therein. The carrier portion 12 has a U-shaped handle 26 with free ends 28 thereof pivotally secured to the pair of side portions 22 thereof. The handle 26 can be lifted to allow a child to be placed within the child receiving recess 24. The handle 26 is also equipped with a locking mechanism to prevent the child from disengaging the handle 26. Each of the pair of side walls 22 have a slot 30 formed therethrough to receive a car seat belt 100 therethrough for securement of the carrier portion 12 within a car. The rear surface 20 has a plurality of hook and loop fastener strips 32 thereon. The child receiving recess 24 is also equipped with a fastening belt 34 to contain a child within the child receiving recess 24. The carrier portion 12 can be constructed in different sizes to accommodate infants as well as toddlers.

The device 10 includes a collapsible stroller portion 38 comprising a seat receiving portion 40, a handle portion 42, a cover portion 44, and a support frame with wheels 46. The collapsible stroller 38 is fabricated in a hammock-type style whereby a child can be placed directly within the stroller 38. The seat receiving portion 40 has a plurality of hook and loop fastener strips 48 disposed thereon. The seat receiving portion 40 is dimensioned to receive the carrier portion 12 thereon with the hook and loop fastener strips 32 of the carrier portion 12 cooperating with the hook and loop fastener strips 48 thereof. The seat receiving portion 40 could be constructed with an adjustable back rest to vary the position of the carrier portion 12 positioned therein. The collapsible stroller portion 38 is similar to collapsing stroller's known in the art, but utilizes the carrier portion 12 for the child to sit. The collapsible stroller 38 will be constructed to accommodate the size of the carrier portion 12.

Figure 5:
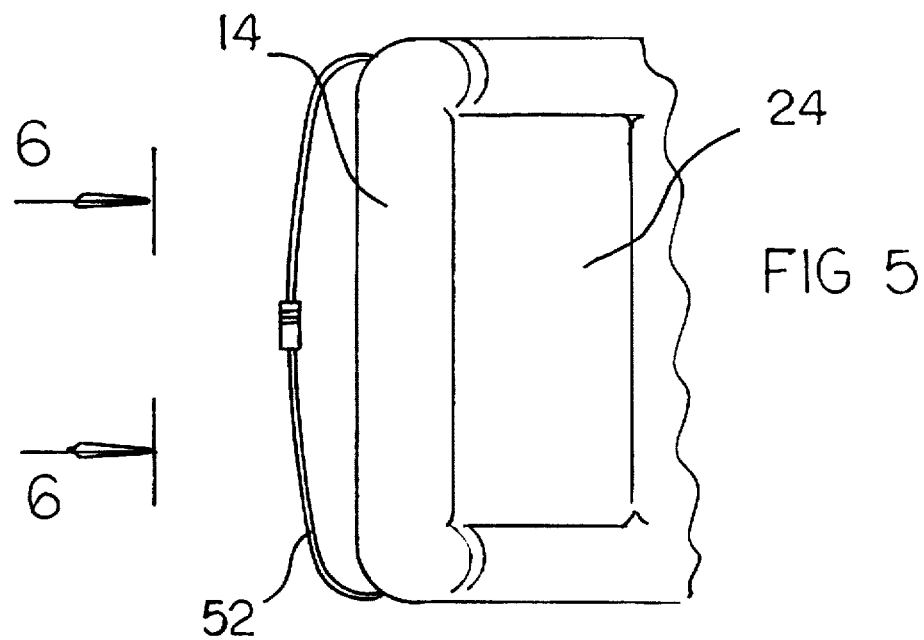
FIG. 5 is a plan view of the carrier illustrating the strap and buckle thereof.
Figure 6:
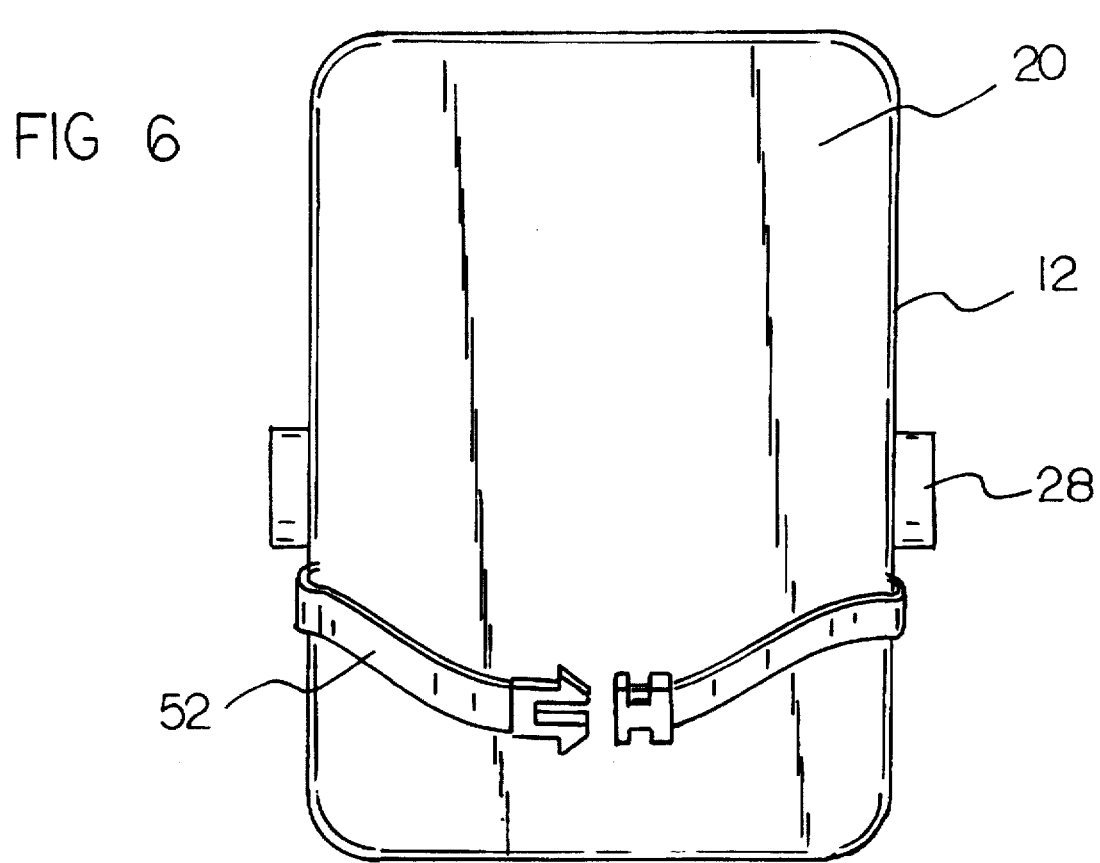
FIG. 6 a rear view of the carrier taken along line 6—6 of FIG. 5.

A second embodiment of the present invention is shown in FIGS. 5 and 6 and includes substantially all of the components of the present invention wherein the hook and loop fastener strips 32 on the carrier portion 12 and the hook and loop fastener strips 48 on the collapsible stroller portion 38 are replaced by a pair of securement straps 52 adapted to wrap around the collapsible stroller portion 38 for securement of the carrier portion 12 thereto.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A combination car seat and stroller for attaching a child's car seat to a stroller for multiple usage comprising, in combination:

a carrier portion having an upper portion, a lower portion, a front surface, a rear surface, and a pair of side portions, the front surface having a child receiving recess formed therein, the carrier portion having a U-shaped handle with free ends thereof pivotally secured to the pair of side portions thereof, each of the pair of side walls having slots formed therethrough to receive a car seat belt therethrough for securement of the carrier portion within a car, the rear surface having a plurality of hook and loop fastener strips thereon;

a collapsible stroller portion comprising a seat receiving portion, a handle portion, a cover portion, and a support frame with wheels, the seat receiving portion comprised of a singular flexible sheet secured within the support frame such that a child may be supported directly thereon, the seat receiving portion having a plurality of hook and loop fastener strips disposed thereon, the seat receiving portion dimensioned to alternately receive the carrier portion thereon with the hook and loop fastener strips of the carrier portion cooperating with the hook and loop fastener strips thereof.

* * * * *